3,114,519
BLOWING LEADING EDGE FLAP

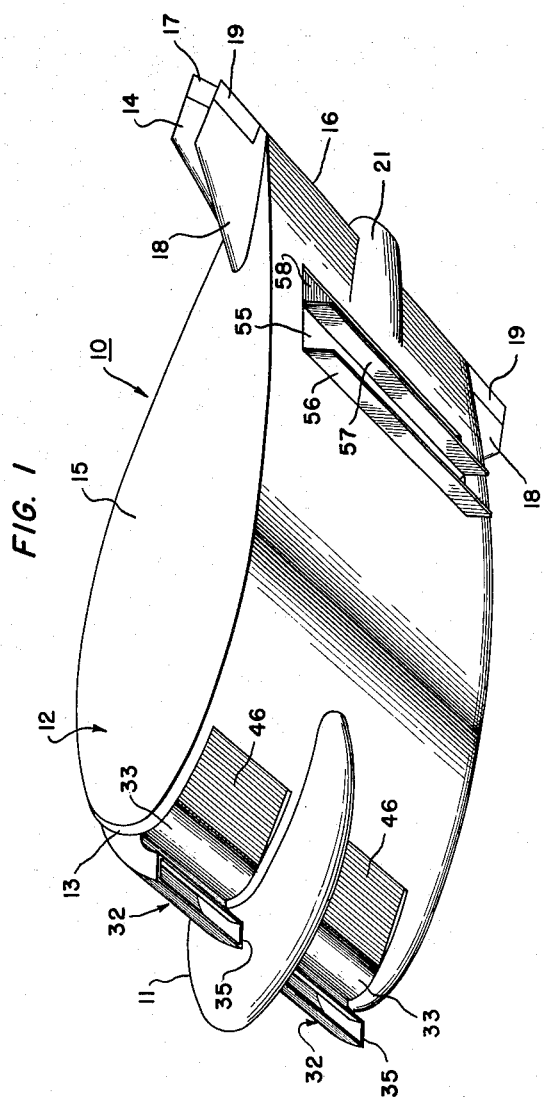

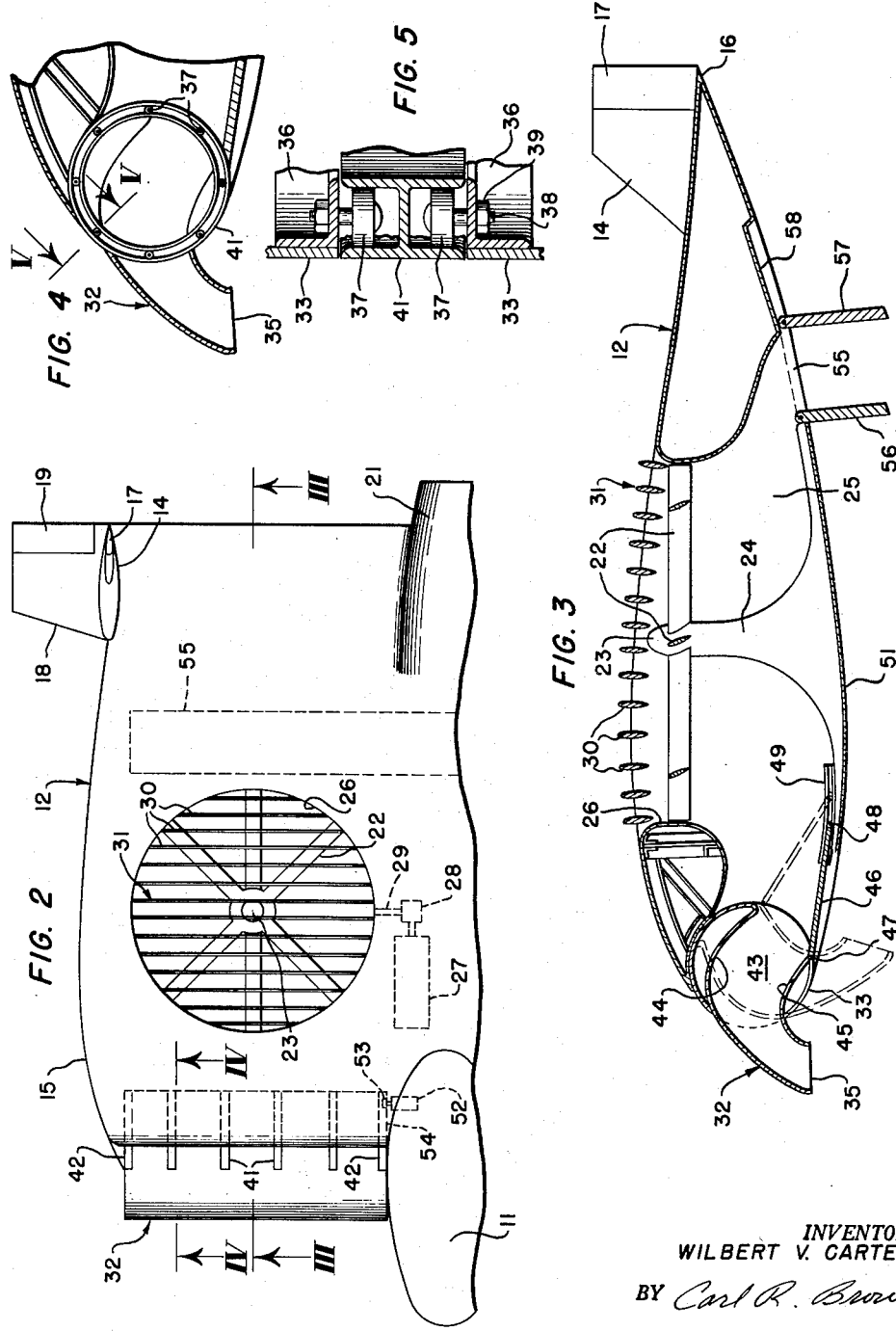

Wilbert V. Carter, La Jolla, Calif., assignor to General Dynamics Corporation, San Diego, Calif., a corporation of Delaware
Filed Aug. 20, 1962, Ser. No. 217,892
16 Claims. (Cl. 244—12)

The present invention relates generally to a blowing leading edge flap and more particularly to an extensible leading edge flap embodying duct means from which a fluid such as air is expelled to augment the lift and thrust of the aircraft wing from which the flap depends.

The blowing leading edge flap of the present invention is adapted for use on a variety of type aircraft. Among these are VTOL (vertical take off and landing) and STOL (short take off and landing) vehicles employing reaction jet forces to effect lift and forward propulsion. Usually in vehicles of this type, i.e. VTOL and STOL, high pressure air is ducted to, and discharged from nozzles located on the lower surface of the wing forward and aft of the vehicles center of gravity. In order to obtain maximum stability during hovering and flight maneuvers, these nozzles are preferably spaced as far from the center of gravity of the airplane as is permitted by the chordwise dimension of the wing. Consequently, since the vehicle's center of gravity is usually located at approximately 40 percent of the wing chord, it is advantageous to position the forward discharge nozzle as far forward as possible, thereby placing it in the leading edge of the wing. If it is assumed that the forward and aft nozzles are of equal thrust and nozzle areas, the spacing about the airplane's center of gravity should be substantially equal in order to effectively achieve a condition of balance. However, even though it may be possible to locate the aft nozzle further aft, the forward nozzle cannot be correspondingly moved further forward and yet remain on the wing.

The novel construction of the blowing leading edge flap of the present invention permits the discharge nozzle thereof to be rotated to a position forward of the wing leading edge for hovering and vertical ascent or descent. During forward flight, the nozzle may be rotated or retracted into the airfoil of the wing, or if desired, the nozzle may be extended or rotated into an attitude whereby the gaseous discharge is directed rearwardly and downwardly at various acute angles relative to the wing chord or to the lower surface thereof.

That portion of the wing leading edge extending outboard from the right and left of the fuselage is provided with at least one blowing leading edge flap which parallels the leading edge from the fuselage to a position substantially adjacent each of the wing tips. If desired the blowing leading edge flap may comprise two or more individual members on each side of the fuselage that are journalled together or suitably spaced by a portion of the usual wing leading edge. When in retracted position, i.e. when folded into the airfoil of the wing, the contour of the blowing leading edge flaps conforms with the configuration of the leading edge wing contour. In cross section, the flaps may be substantially circular with a tangentially disposed nozzle depending therefrom. Rotation of the flaps from a retracted to an extended position or vice versa is achieved through a pilot-controlled actuator mounted onto the wing or fuselage structure and suitably geared to the flap. Circular tracks secured to the wing structure at spanwise spaced intervals serve to support and guide the flaps through their arc of rotation by the engagement of the flap rollers with the rails of the tracks. Fans mounted within the wing draw the sustaining fluid or air from above the wing upper surface discharging it through slotted nozzles in the lower wing surface to first create ground effect lift and thereafter reaction lift.

An object of the present invention is to provide a blowing leading edge flap adapted to improve the stability of a fluid supported vehicle when in flight or hovering attitudes.

Another object of this invention lies in the ability of the blowing leading edge flap to be retracted into the contour of the wing leading edge of a fluid supported vehicle and to be rotated into an attitude whereby the nozzle thereof is directed forwardly and downwardly of the wing leading edge.

A further object of this invention is to provide a blowing leading edge flap for aircraft adapted for rotation into a multiplicity of attitudes in order to effect vertical lift, forward and reverse movement, and braking action.

A still further object of this invention is to provide a blowing leading edge flap adapted to augment the lifting and propulsive thrust forces of the engines of the aircraft.

Other objects and features of the present invention will be readily apparent to those skilled in the art from the following specification and appended drawings wherein is illustrated a preferred form of the invention, and in which:

FIGURE 1 is a perspective view of an airplane embodying the blowing leading edge flap of the present invention.

FIGURE 2 is a fragmentary top or plan view thereof.

FIGURE 3 is an enlarged transverse section through the wing taken on the line III—III of FIGURE 2 showing the blowing leading edge flap in position for vertical take-off.

FIGURE 4 is an enlarged fragmentary transverse section taken on the line IV—IV of FIGURE 2, and FIGURE 5 is an enlarged fragmentary section taken on the line V—V of FIGURE 4.

An airplane that may be considered of the VTOL type and generally designated by the numeral 10, comprises a body or fuselage 11 positioned about the centerline of the spanwise length of a wing 12. Body or fuselage 11 projects forwardly of the leading edge 13 of the wing 12 in order to provide maximum pilot visibility. A pair of vertical stabilizers 14 located adjacent wing tips 15 project upwardly from the upper surface of wing 12 at the trailing edge 16 thereof. Rudder control surfaces 17 are hinged to stabilizers 14 in a usual manner to provide means for steering. Horizontal stabilizers 18 extend outwardly from wing tips 15 at the trailing edge 16 of wing 12. Elevons 19 are hinged to stabilizers 18 in a usual manner to provide control means whereby airplane 10 may be made to bank, climb or dive during flight maneuvers. A jet engine 21 is mounted in wing 12 at the centerline thereof in tandem arrangement with body 11. A pair of fans 22 located within the interior of wing 12 on opposite sides of body 11 are rotatable in a horizontal plane about a vertical axis. The hub 23 of fans 22 rests upon a vertical support member 24 which further serves as a housing for the fan drive shaft and gear box (not shown) in addition to forming one wall of a passageway of an air discharge duct 25. Fans 22 are enclosed by an annular wall 26 which forms the opposite wall of duct 25. Fans 22 are driven by a suitable engine 27 through a gear box 28 and drive shaft 29. Venetian blind type closure members 31 span across duct openings 25 at the upper surface of wing 12 providing means whereby duct 25 may be sealed off or closed when airplane 10 is in forward flight.

Leading edge 13 of wing 12 houses and rotatably supports the blowing leading edge flaps 32 of the present invention. Flaps 32 comprise an elongated member 33 having a substantially circular cross-sectional configuration with a tangentially disposed discharge nozzle 35 depending therefrom. At longitudinally spaced intervals, flaps 32 are provided with annular frames 36 which are secured thereto as by welding or riveting. A plurality of circumferentially spaced rollers 37 secure to frame 36 by means of bolts 38 and nuts 39. Rollers 37 are preferably of a usual ball or roller bearing type in order to effect smooth operation with a minimum of friction. A plurality of annular tracks 41 secured to the structure of wing 12 are spaced spanwise thereof from end tracks 42. Tracks 41 are substantially H-shaped in cross-sectional configuration in order to accommodate sets of rollers 37 at the inboard and outboard sides thereof. Tracks 42 may be substantially U-shaped in cross-section if desired since they need only accommodate sets of rollers 37 on one side thereof. Coextensive with discharge nozzle 35 is a passageway 43 having the walls 44 and 45 thereof transecting elongated member 33 and terminating at the circumference thereof. Suitably hinged to wall 45 at its juncture with the circumference of elongated member 33 is a closure member 46 having a hinge 47 at one end connected to elongated member 33 and rollers 48 projecting from the inboard and outboard corners of the opposite end thereof. Rollers 48 are rotatably retained by a pair of guides 49 which secure to the wing structure adjacent the lower surface 51 of wing 12. Flaps 32 are rotated by a suitable electrically or hydraulically actuated motor 52 geared to elongated member 33 by a pinion gear 53 in mesh with a ring gear 54 secured to inboard track 42.

Wing 12 forward of trailing edge 16 is provided with an opening 55 communicating with discharge duct 25. A door 56 hinged to the wing structure forwardly of opening 55 may be rotated about its hinge axis into various angular attitudes from a fully opened to a fully closed position. A second door 57 is hingedly secured to the wing structure aft of opening 55 and is adapted to be opened and closed in unison with door 56 in order to direct the flow of air from fan 22 toward the ground or at various angles with respect to the ground. Doors 56 and 57 are preferably operable in unison from open to closed position by a suitable linkage and actuator mechanism (not shown). Wing 12 is recessed at 58 to receive door 57 when airplane 10 is in forward flight.

As illustrated in FIGURES 1, 2 and 3 of the drawings, the position of the various control elements of airplane 10 are disposed in an attitude commensurate with vertical take-off; i.e., the blowing leading edge flaps 32 are rotated into extended position with discharge nozzles 35 thereof directed downwardly, doors 56 and 57 are in open position, and the louvers 30 of the Venetian blind closure members 31 are in open position. During vertical take-off, fans 22 driven by motors 27 draw air from above wing 12 through the open louvers 30 of Venetian blind closure 31 and into air discharge duct 25. Subsequently the air exhausts to atmosphere through passageways 43 and nozzles 35 of blowing leading edge flap 32 and rear nozzle as defined by doors 56 and 57. Thus vertical lift is afforded airplane 10. As the airplane approaches the desired attitude, the pilot may actuate controls (not shown) to shift or rotate blowing leading edge flaps 32 into forward thrust position as shown in dash outline in FIGURE 3 of the drawings. Simultaneous with the rotation of flaps 32, doors 56 and 57 may also be shifted at an acute angle with respect to the wing chord so as to direct the flow of air discharging therebetween in a substantially rearward direction. During transition, jet engine 21 may be in operation to augment the forward thrust created by blowing leading edge flaps 32 and doors 56 and 57. As airplane 10 gains sufficient speed to be sustained by wing 12, fans 22 are stopped and flaps 32 are rotated by motor 52 and gearing 53 and 54 into fully retracted position wherein the outer configuration thereof lies in the plane of the airfoil profile. Simultaneously door 56 is rotated about its hinge axis to span and close opening 55 and door 57 is rotated about its hinge axis to its position within recess 58. Louvers 30 are then rotated into the plane of the wing profile by a suitable pilot controlled linkage and actuator mechanism (not shown). Upon closing of these openings, engine 21 powers airplane 10 in forward flight in a normal and usual manner.

Although the blowing leading edge flaps of the present invention have been illustrated and described in connection with a particular airplane design, it is to be noted that such design has been selected only as an example of an airplane to which the invention is adaptable. It is contemplated that the blowing leading edge flaps are equally adaptable for use on aircraft of a substantially conventional design. Consequently the benefits obtained by projecting the present blowing flaps forwardly of the wing leading edge will accrue to airplanes of a wide variety of design and configurations.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A blowing leading edge flap for a fluid sustained vehicle comprising:

an elongated member pivotally secured to a wing of said fluid sustained vehicles;

an elongated discharge nozzle projecting from said elongated member;

means defining a passageway in said elongated member for conducting a sustaining fluid to said discharge nozzle;

said elongated member being rotatable to position said discharge nozzle to direct said sustaining fluid in various angular attitudes relative to said wing; the arc of rotational movement of said discharge nozzle including positions to expel said sustaining fluid between a downwardly and a rearwardly attitude relative to said wing; and said discharge nozzle being positionable to direct the flow of sustaining fluid vertically downward and forward of the leading edge of said wing.

2. A blowing leading edge flap for a fluid sustained vehicle comprising:

an elongated member pivotally secured to a wing of said fluid sustained vehicle;

an elongated discharge nozzle projecting from said elongated member;

means defining a passageway in said elongated member for conducting a sustaining fluid to said discharge nozzle;

said elongated member being rotatable to direct the flow of sustaining fluid exhausting from said discharge nozzle in various angular attitudes from retracted to extended positions relative to said wing; the arc of rotational movement of said discharge nozzle including positions to expel said sustaining fluid between a downwardly and a rearwardly attitude relative to said wing;

said discharge nozzle forming the forward undersurface of said wing when in retracted position; and said discharge nozzle being positionable to direct the flow of sustaining fluid vertically downward and forward of the leading edge of said wing.

3. A blowing leading edge flap for a fluid sustained vehicle comprising:

an elongated member pivotally secured to a wing of said fluid sustained vehicle;

an elongated discharge nozzle coextensive with and projecting from said elongated member;

means defining a passageway in said elongated member for conducting a sustaining fluid to said discharge nozzle;

said elongated member being rotatable to direct the flow of sustaining fluid exhausting from said discharge nozzle in various attitudes from retracted to extended positions relative to said wing;

said discharge nozzle forming the forward undersurface of said wing when in retracted position;

said discharge nozzle projecting forwardly of the leading edge of said wing when in extended position; and a closure member hingedly secured to said elongated member forming the forward undersurface of said wing when said discharge nozzle is in various attitudes of extension.

4. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;
   said elongated member being rotatable to direct the flow of sustaining fluid exhausting from said discharge nozzle in various attitudes from retracted to extended positions relative to said wing;
   said discharge nozzle forming the forward undersurface of said wing when in retracted position;
   said discharge nozzle projecting forwardly of the leading edge of said wing when in extended position;
   a closure member hinged at one end to said elongated member;
   guide means secured within said wing adjacent the lower surface thereof; and
   rollers journalled on said closure member opposite said hinged end;
   said rollers engaging said guide means;
   said closure member being movable upon rotation of said elongated member to effect closure of the forward undersurface of said wing when said discharge nozzle is in various attitudes of extension.

5. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;
   rollers journalled on said elongated member spaced about the periphery thereof;
   tracks secured to the structure of said wing;
   said rollers engaging said tracks to rotatably retain said elongated member onto said wing;
   said elongated member being rotatable to direct the flow of sustaining fluid exhausting from said discharge nozzle in various attitudes from retracted to extended positions relative to said wing;
   said discharge nozzle forming the forward undersurface of said wing when in retracted position; and
   said discharge nozzle projecting forwardly of the leading edge of said wing when in extended position.

6. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;
   rollers journalled on said elongated member spaced about the periphery thereof;
   tracks secured to the structure of said wing;
   said rollers engaging said tracks to rotatably retain said elongated member onto said wing;
   said elongated member being rotatable to direct the flow of sustaining fluid exhausting from said discharge nozzle in various attitudes from retracted to extended positions relative to said wing;
   said discharge nozzle forming the forward undersurface of said wing when in retracted position;
   said discharge nozzle projecting forwardly of the leading edge of said wing when in extended position; and
   a closure member hingedly secured to said elongated member forming the forward undersurface of said wing when said discharge nozzle is in various attitudes of extension.

7. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;
   rollers journalled on said elongated member spaced about the periphery thereof;
   tracks secured to the structure of said wing;
   said rollers engaging said tracks to rotatably retain said elongated member onto said wing;
   said elongated member being rotatable to direct the flow of sustaining fluid exhausting from said discharge nozzle in various attitudes from retracted to extended positions relative to said wing;
   said discharge nozzle forming the forward undersurface of said wing when in retracted position;
   said discharge nozzle projecting forwardly of the leading edge of said wing when in extended position;
   a closure member hinged at one end to said elongated member;
   guide means secured within said wing adjacent the lower surface thereof; and
   rollers journalled on said closure member opposite said hinged end;
   said rollers engaging said guide means;
   said closure member being movable upon rotation of said elongated member to effect closure of the forward undersurface of said wing when said discharge nozzle is in various attitudes of extension.

8. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;
   rollers journalled on said elongated member spaced about the periphery thereof;
   tracks secured to the structure of said wing;
   said rollers engaging said tracks for rotatably retaining said elongated member onto said wing;
   an actuator geared to said elongated member;
   said actuator being adapted to rotatably position said discharge nozzle of said elongated member in various attitudes of extension and retraction relative to said wing;
   said discharge nozzle forming the forward undersurface of said wing when in retracted position; and
   said discharge nozzle projecting forwardly of the leading edge of said wing when in extended position.

9. A blowing leading edge flap for a fluid sustained vehicle comprising:
   an elongated member pivotally secured to the wing of an air vehicle;
   an elongated discharge nozzle coextensive with and projecting from said elongated member;
   means defining a passageway in said elongated member for conducting a sustaining fluid to said discharge nozzle;

rollers journalled on said elongated member spaced about the periphery thereof;

tracks secured to the structure of said wing;

said rollers engaging said tracks for rotatably retaining said elongated member onto said wing;

an actuator geared to said elongated member;

said actuator being adapted to rotatably position said discharge nozzle of said elongated member in various attitudes of extension and retraction relative to said wing;

said discharge nozzle forming the forward undersurface of said wing when in retracted position;

said discharge nozzle projecting forwardly of the leading edge of said wing when in extended position; and a closure member hingedly secured to said elongated member forming the forward undersurface of said wing when said discharge nozzle is in various attitudes of extension.

10. A blowing leading edge flap for a fluid sustained vehicle comprising:

an elongated member pivotally secured to the wing of an air vehicle;

an elongated discharge nozzle coextensive with and projecting from said elongated member;

means defining a passageway in said elongated member for conducting a sustaining fluid to said discharge nozzle;

rollers journalled on said elongated member spaced about the periphery thereof;

tracks secured to the structure of said wing;

said rollers engaging said tracks for rotatably retaining said elongated member onto said wing;

an actuator geared to said elongated member;

said actuator being adapted to rotatably position said discharge nozzle of said elongated member in various attitudes of extension and retraction relative to said wing;

said discharge nozzle forming the forward undersurface of said wing when in retracted position;

said discharge nozzle projecting forwardly of the leading edge of said wing when in extended position;

a closure member hinged at one end to said elongated member;

guide means secured within said wing adjacent the lower surface thereof; and rollers journalled on said closure member opposite said hinged end;

said rollers engaging said guide means;

said closure member being movable upon rotation of said elongated member to effect closure of the forward undersurface of said wing when said discharge nozzle is in various attitudes of extension.

11. In combination with an airplane having a wing, a blowing leading edge flap comprising:

an elongated member pivotally secured to the wing of said airplane;

an elongated discharge nozzle coextensive with and projecting from said elongated member;

means defining a passageway in said elongated member for conducting a sustaining fluid to said discharge nozzle;

said elongated member being rotatable to direct the flow of sustaining fluid exhausting from said discharge nozzle in various angular attitudes from retracted to extended positions relative to said wing, the arc of rotational movement of said discharge nozzle including positions to expel said sustaining fluid between a downwardly and a rearwardly attitude relative to said wing; and said discharge nozzle being positionable to direct the flow of sustaining fluid vertically downward and forward of the leading edge of said wing.

12. In combination with an airplane having a wing, a blowing leading edge flap comprising:

an elongated member pivotally secured to the wing of said airplane;

an elongated discharge nozzle coextensive with and projecting from said elongated member;

means defining a passageway in said elongated member for conducting a sustaining fluid to said discharge nozzle;

said elongated member being rotatable to direct the flow of sustaining fluid exhausting from said discharge nozzle in various attitudes from retracted to extended positions relative to said wing;

said discharge nozzle forming the forward undersurface of said wing when in retracted position;

said discharge nozzle projecting forwardly of the leading edge of said wing in extended position; and a closure member hingedly secured to said elongated member forming the forward undersurface of said wing when said discharge nozzle is in various attitudes of extension.

13. In combination with an airplane having a wing, a blowing leading edge flap comprising:

an elongated member pivotally secured to the wing of said airplane;

an elongated discharge nozzle coextensive with and projecting from said elongated member;

means defining a passageway in said elongated member for conducting a sustaining fluid to said discharge nozzle;

rollers journalled on said elongated member spaced about the periphery thereof;

tracks secured to the structure of said wing;

said rollers engaging said tracks to rotatably retain said elongated member onto said wing;

said elongated member being rotatable to direct the flow of sustaining fluid exhausting from said discharge nozzle in various attitudes from retracted to extended positions relative to said wing;

said discharge nozzle forming the forward undersurface of said wing when in retracted position; and said discharge nozzle projecting forwardly of the leading edge of said wing when in extended position.

14. In combination with an airplane having a wing, a blowing leading edge flap comprising:

an elongated member pivotally secured to the wing of said airplane;

an elongated discharge nozzle coextensive with and projecting from said elongated member;

means defining a passageway in said elongated member for conducting a sustaining fluid to said discharge nozzle;

rollers journalled on said elongated member spaced about the periphery thereof;

tracks secured to the structure of said wing;

said rollers engaging said tracks to rotatably retain said elongated member onto said wing;

said elongated member being rotatable to direct the flow of sustaining fluid exhausting from said discharge nozzle in various attitudes from retracted to extended positions relative to said wing;

said discharge nozzle forming the forward undersurface of said wing when in retracted position;

said discharge nozzle projecting forwardly of the leading edge of said wing when in extended position; and a closure member hingedly secured to said elongated member forming the forward undersurface of said wing when said discharge nozzle is in various attitudes of extension.

15. In combination with an airplane having a wing, a blowing leading edge flap comprising:

an elongated member pivotally secured to the wing of said airplane;

an elongated discharge nozzle coextensive with and projecting from said elongated member;

means defining a passageway in said elongated member for conducting a sustaining fluid to said discharge nozzle;
rollers journalled on said elongated member spaced about the periphery thereof;
tracks secured to the structure of said wing;
said rollers engaging said tracks for rotatably retaining said elongated member onto said wing;
an actuator geared to said elongated member;
said actuator being adapted to rotatable position said discharge nozzle of said elongated member in various attitudes of extension and retraction relative to said wing;
said discharge nozzle forming the forward undersurface of said wing when in retracted position; and
said discharge nozzle projecting forwardly of the leading edge of said wing when in extended position.

16. In combination with an airplane having a wing, a blowing leading edge flap comprising:
an elongated member pivotally secured to the wing of said airplane;
an elongated discharge nozzle coextensive with and projecting from said elongated member;
means defining a passageway in said elongated member for conducting a sustaining fluid to said discharge nozzle;
rollers journalled on said elongated member spaced about the periphery thereof;
tracks secured to the structure of said wing;
said rollers engaging said tracks for rotatably retaining said elongated member onto said wing;
an actuator geared to said elongated member;
said actuator being adapted to rotatable position said discharge nozzle of said elongated member in various attitudes of extension and retraction relative to said wing;
said discharge nozzle forming the forward undersurface of said wing when in retracted position;
said discharge nozzle projecting forwardly of the leading edge of said wing when in extended position;
a closure member hinged at one end to said elongated member;
guide means secured within said wing adjacent the lower surface thereof; and
rollers journalled on said closure member opposite said hinged end;
said rollers engaging said guide means;
said closure member being movable upon rotation of said elongated member to effect closure of the forward undersurface of said wing when said discharge nozzle is in various attitudes of extension.

References Cited in the file of this patent
UNITED STATES PATENTS

| | | |
|---|---|---|
| 2,478,793 | Trey | Aug. 9, 1949 |
| 2,941,751 | Gagarin | June 21, 1960 |
| 3,077,321 | Dunham | Feb. 12, 1963 |